(12) United States Patent
Tsukamoto

(10) Patent No.: US 12,429,354 B2
(45) Date of Patent: Sep. 30, 2025

(54) APPARATUS AND METHOD FOR UPDATING MAP AND NON-TRANSITORY COMPUTER-READABLE MEDIUM CONTAINING COMPUTER PROGRAM FOR UPDATING MAP

(71) Applicant: TOYOTA JIDOSHA KABUSHIKI KAISHA, Toyota (JP)

(72) Inventor: Mamoru Tsukamoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 17/865,975

(22) Filed: Jul. 15, 2022

(65) Prior Publication Data
US 2023/0045345 A1    Feb. 9, 2023

(30) Foreign Application Priority Data
Aug. 4, 2021 (JP) .................................. 2021-128533

(51) Int. Cl.
    *G01C 21/00* (2006.01)
(52) U.S. Cl.
    CPC ..... *G01C 21/3822* (2020.08); *G01C 21/3848* (2020.08); *G01C 21/3859* (2020.08)
(58) Field of Classification Search
    CPC .................. G01C 21/38–3896; G01C 21/3602
    See application file for complete search history.

(56) References Cited

U.S. PATENT DOCUMENTS

| | | | |
|---|---|---|---|
| 10,178,507 B1* | 1/2019 | Roberts | H04W 4/026 |
| 11,885,625 B1* | 1/2024 | McGavran | G01C 21/32 |
| 2010/0268452 A1* | 10/2010 | Kindo | G01C 21/3658 |
| | | | 345/632 |
| 2011/0060524 A1* | 3/2011 | Miyajima | B60T 7/18 |
| | | | 707/687 |
| 2019/0243372 A1* | 8/2019 | Huval | G05D 1/0214 |
| 2020/0132477 A1* | 4/2020 | Averilla | G06T 19/00 |
| 2020/0200547 A1* | 6/2020 | Miller | G01C 21/3874 |
| 2020/0256698 A1* | 8/2020 | Shi | G01C 21/3867 |
| 2020/0363217 A1* | 11/2020 | Zhang | G06V 10/95 |
| 2020/0378788 A1* | 12/2020 | Fujita | G08G 1/13 |
| 2020/0393261 A1* | 12/2020 | Zhang | G08G 1/0141 |
| 2021/0004017 A1 | 1/2021 | Colgate et al. | |
| 2021/0041263 A1 | 2/2021 | Hirate et al. | |
| 2021/0064057 A1* | 3/2021 | Eldar | B60W 30/12 |
| 2021/0199463 A1 | 7/2021 | Kitahara et al. | |
| 2024/0025411 A1* | 1/2024 | Nomura | G06V 20/588 |

FOREIGN PATENT DOCUMENTS

| | | |
|---|---|---|
| CN | 112033420 A | 12/2020 |
| JP | 2004-185227 A | 7/2004 |
| JP | 2005-098853 A | 4/2005 |

(Continued)

*Primary Examiner* — Keith D Bloomquist
(74) *Attorney, Agent, or Firm* — Oliff PLC

(57) ABSTRACT

An apparatus for updating a map detects a feature in an area around a vehicle traveling on a road from situation data representing the situation around the vehicle, and updates a lane network representing a connection relationship between lanes included in road sections into which the road is divided. The lane network is stored in a storage unit and updated to match a connection relationship between lanes indicated by the detected feature.

7 Claims, 6 Drawing Sheets

(56) References Cited

FOREIGN PATENT DOCUMENTS

| | | | |
|---|---|---|---|
| JP | 2008-139157 | A | 6/2008 |
| JP | 2011-013233 | A | 1/2011 |
| JP | 2019-179217 | A | 10/2019 |
| JP | 2019-191653 | A | 10/2019 |
| JP | 2020-038361 | A | 3/2020 |
| JP | 2020-201210 | A | 12/2020 |

* cited by examiner

APPARATUS AND METHOD FOR UPDATING MAP AND NON-TRANSITORY COMPUTER-READABLE MEDIUM CONTAINING COMPUTER PROGRAM FOR UPDATING MAP

FIELD

The present disclosure relates to an apparatus, a method, and a computer program for updating a map to manage the map, based on data representing features around a vehicle.

BACKGROUND

High-precision maps to which an autonomous vehicle-driving system refers for autonomous driving control of a vehicle are required to accurately represent conditions of roads. Thus, a technique to collect data representing conditions of roads from vehicles actually traveling on the roads to update a map with the collected data has been proposed.

Japanese Unexamined Patent Publication No. 2019-179217 (hereafter, "Patent Literature 1") describes a method for correcting map data on the basis of road structures. In the method described in Patent Literature 1, a device for correcting a map sets grid points on map data, detects a road structure around a vehicle, including lane lines, and calculates offset parameters of the respective grid points so that the difference between the detected road structure and the road structure in the map data decreases. The device then corrects the map data, using the offset parameters of the respective grid points.

An autonomous vehicle-driving system executes autonomous driving control of a vehicle so that the vehicle will travel appropriately along a lane. To achieve this, the system uses a map including a lane network representing a connection relationship between lanes included in road sections.

The lane network can be generated, for example, by a device for generating a lane map that operates as follows. A device for generating a map extracts groups of center points of travel lanes of vehicles from each of local images. The local images are captured by image capturing means mounted on vehicles for taking pictures of the surroundings of the vehicles, and are given positional information of the vehicles. The device classifies the groups of center points of travel lanes, based on a wide-area image obtained by collating and combining the local images, so that each group includes center points of a single travel lane. For each link in a road network, the device further generates center lines of non-branching travel lanes corresponding to the link, using a non-branching lane model. At each node in the road network, the device also generates center lines of branching lanes leading to connectable non-branching travel lanes, using a branching lane model.

SUMMARY

After a lane network is generated, conditions of roads may be changed, for example, because of construction. For the purpose of appropriate travel control by an autonomous vehicle-driving system, it is desirable to update the lane network, depending on conditions of roads.

It is an object of the present disclosure to provide an apparatus for updating a map that can update a lane network with data representing features around a vehicle.

The apparatus for updating a map according to the present disclosure includes a processor configured to detect a feature in an area around a vehicle traveling on a road from situation data representing the situation around the vehicle, and to update a lane network representing a connection relationship between lanes included in road sections into which the road is divided. The lane network is stored in a memory and updated to match a connection relationship between lanes indicated by the detected feature.

Preferably, the processor of the apparatus according to the present disclosure detects, in the detection, a signpost or a road marking indicating a travel direction at an intersection as the feature from the situation data; and updates, in the update, the lane network to connect a first lane where the signpost or the road marking is detected to a second lane lying in the travel direction indicated by the signpost or the road marking as viewed from the first lane.

Preferably, the processor of the apparatus according to the present disclosure detects, in the detection, a stop line on a road near an intersection as the feature from the situation data; and updates, in the update, the lane network to connect a lane where the stop line is detected to a lane where the stop line is not detected, of lanes connected to the intersection.

Preferably, the processor of the apparatus according to the present disclosure detects, in the detection, a lane line on a road as the feature from the situation data; and updates, in the update, the lane network on the road so that the lane network matches lanes the number of which is calculated from the number of detected lane lines.

Preferably, the lane network includes a first lane network and a second lane network that is not connected to the first lane network; the processor of the apparatus according to the present disclosure detects, in the detection, a lane line within a predetermined distance of the first lane network as the feature from the situation data; the lane line lies on a road where the second lane network is set; and updates, in the update, the lane network to connect the first lane network to the second lane network.

A method for updating a map according to the present disclosure includes detecting a feature in an area around a vehicle traveling on a road from situation data representing the situation around the vehicle; and updating a lane network representing a connection relationship between lanes included in road sections into which the road is divided. The lane network is stored in a memory and updated to match a connection relationship between lanes indicated by the detected feature.

A computer program for updating a map stored in a non-transitory computer-readable medium according to the present disclosure causes a computer to execute a process including detecting a feature in an area around a vehicle traveling on a road from situation data representing the situation around the vehicle; and updating a lane network representing a connection relationship between lanes included in road sections into which the road is divided. The lane network is stored in a memory and updated to match a connection relationship between lanes indicated by the detected feature.

The apparatus according to the present disclosure can update a lane network with data representing features around a vehicle.

DESCRIPTION OF EMBODIMENTS

An apparatus for updating a map that can update a lane network with data representing features around a vehicle will now be described in detail with reference to the attached drawings. The apparatus of the present embodiment is a server that collects situation data representing the situation around a vehicle from the vehicle, that updates a map with the collected situation data, and that delivers the updated map to the vehicle. The map includes a lane network representing a connection relationship between lanes included in road sections. From the situation data, the apparatus detects that features in an area around the vehicle which indicates a connection relationship between lanes, such as a signpost, a road marking, a lane line, or a stop line. The apparatus then updates the lane network so that it matches a connection relationship between lanes indicated by the detected features. The map updated by the apparatus is used for autonomous driving control.

The vehicle that obtains situation data is equipped with a surround capturing camera that outputs an image of the surroundings representing the situation around the vehicle. The image of the surroundings is an example of the situation data. The vehicle is equipped with a device for obtaining situation data that obtains an image of the surroundings from the surround capturing camera and that transmits the image to the apparatus 1 for updating a map via a communication network including a wireless base station. The device may be mounted on the vehicle as a drive recorder.

The vehicle is equipped with a global navigation satellite system (GNSS) receiver. The situation data transmitted to the apparatus 1 includes a positioning signal indicating the position of the vehicle measured on the basis of GNSS signals received by the GNSS receiver. A detection unit 141 of the apparatus 1 can identify the position indicated by the image of the surroundings, using the positioning signal.

The situation data transmitted to the apparatus 1 may include a signal indicating the imaging direction of the surround capturing camera and the focal length of the optical system included in the camera. Using this information, the detection unit 141 can identify the position indicated by the image of the surroundings more appropriately.

The vehicle may record the situation data on a computer-readable and portable medium. The apparatus 1 can obtain the situation data by reading the medium with a media reader (not shown) connected to a communication interface 11.

Figure 1:
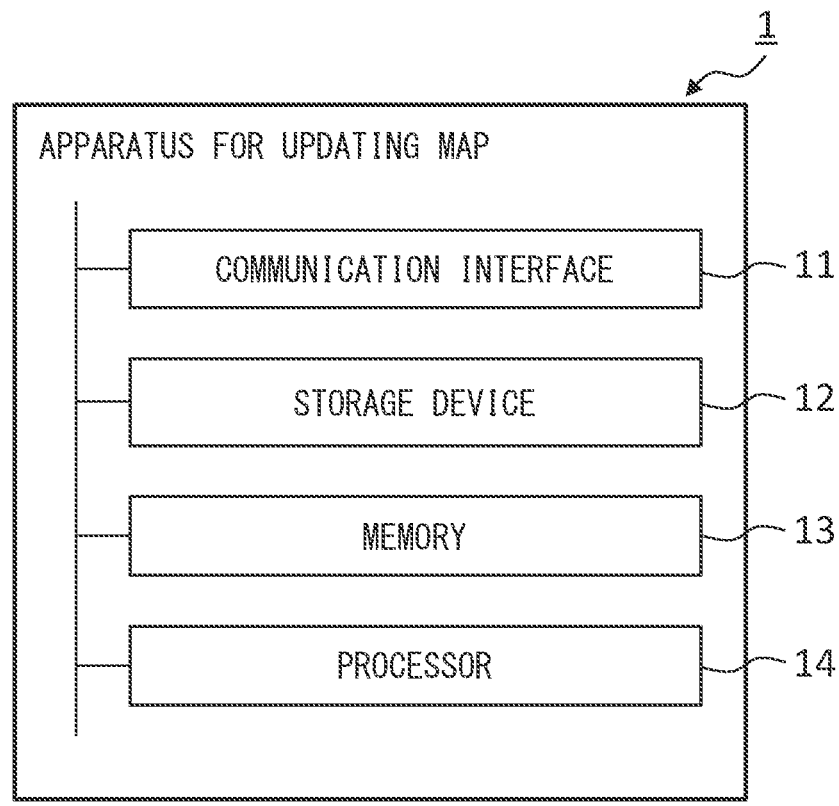
FIG. 1 illustrates the hardware configuration of an apparatus for updating a map.

FIG. 1 illustrates the hardware configuration of the apparatus 1 for updating a map. The apparatus 1 includes a communication interface 11, a storage device 12, a memory 13, and a processor 14.

The communication interface 11, which is an example of a communication unit, includes an interface circuit for connecting the apparatus 1 to a communication network. The communication interface 11 is configured so that it can communicate with another device via the communication network. More specifically, the communication interface 11 passes to the processor 14 data received from a device via the communication network, and transmits data received from the processor 14 to a device via the communication network.

The storage device 12, which is an example of the storage unit, includes storage, such as a hard disk drive or a nonvolatile semiconductor memory. The storage device 12 contains a map including a lane network representing a connection relationship between lanes.

The memory 13 includes volatile and nonvolatile semiconductor memories. The memory 13 temporarily contains various types of data used for processing by the processor 14, such as situation data representing the situation around a vehicle. The memory 13 also contains various application programs, such as a map update program for updating the map stored in the storage device 12.

The processor 14 includes one or more central processing units (CPUs) and a peripheral circuit thereof. The processor 14 may further include another operating circuit, such as a logic-arithmetic unit or an arithmetic unit.

Figure 2:
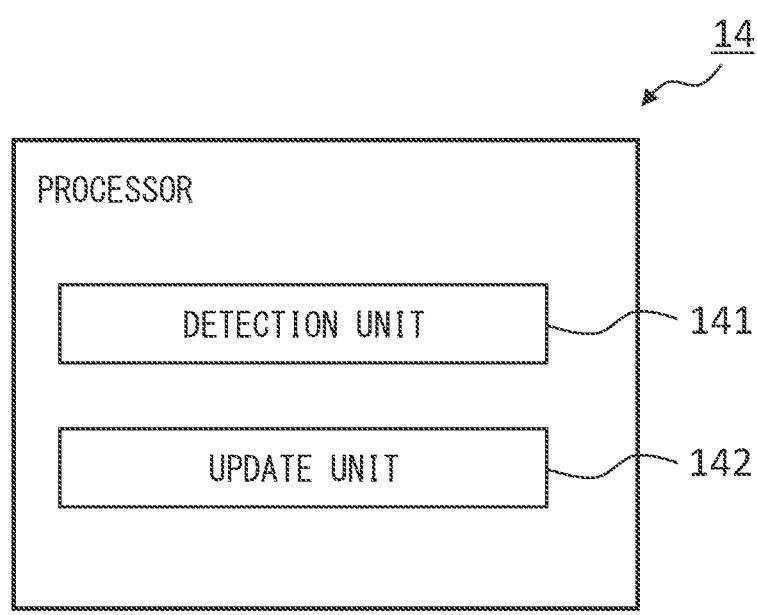
FIG. 2 is a functional block diagram of a processor included in the apparatus for updating a map.

FIG. 2 is a functional block diagram of the processor 14 included in the apparatus 1.

As its functional blocks, the processor 14 of the apparatus 1 includes a detection unit 141 and an update unit 142. These units included in the processor 14 are functional modules implemented by a computer program executed by the processor 14. The computer program for achieving the functions of the units of the processor 14 may be provided in a form recorded on a computer-readable and portable medium, such as a semiconductor memory, a magnetic medium, or an optical medium. Alternatively, the units included in the processor 14 may be implemented in the apparatus 1 as separate integrated circuits, microprocessors, or firmware.

The detection unit 141 detects a feature in an area around a vehicle (not shown) traveling on a road from situation data representing the situation around the vehicle.

The detection unit 141 inputs an image of the surroundings into a classifier that has been trained to identify features on or around a road, thereby detecting a feature in an area around the vehicle from the image.

The classifier may be, for example, a convolutional neural network (CNN) including convolution layers connected in series from the input toward the output. A CNN that has been trained in accordance with a predetermined training technique, such as backpropagation, using images including features as training data operates as a classifier to detect features from an image of the surroundings.

The update unit 142 updates a lane network included in the map stored in the storage device 12 so that the lane network matches a connection relationship between lanes indicated by the detected feature.

Figure 3:
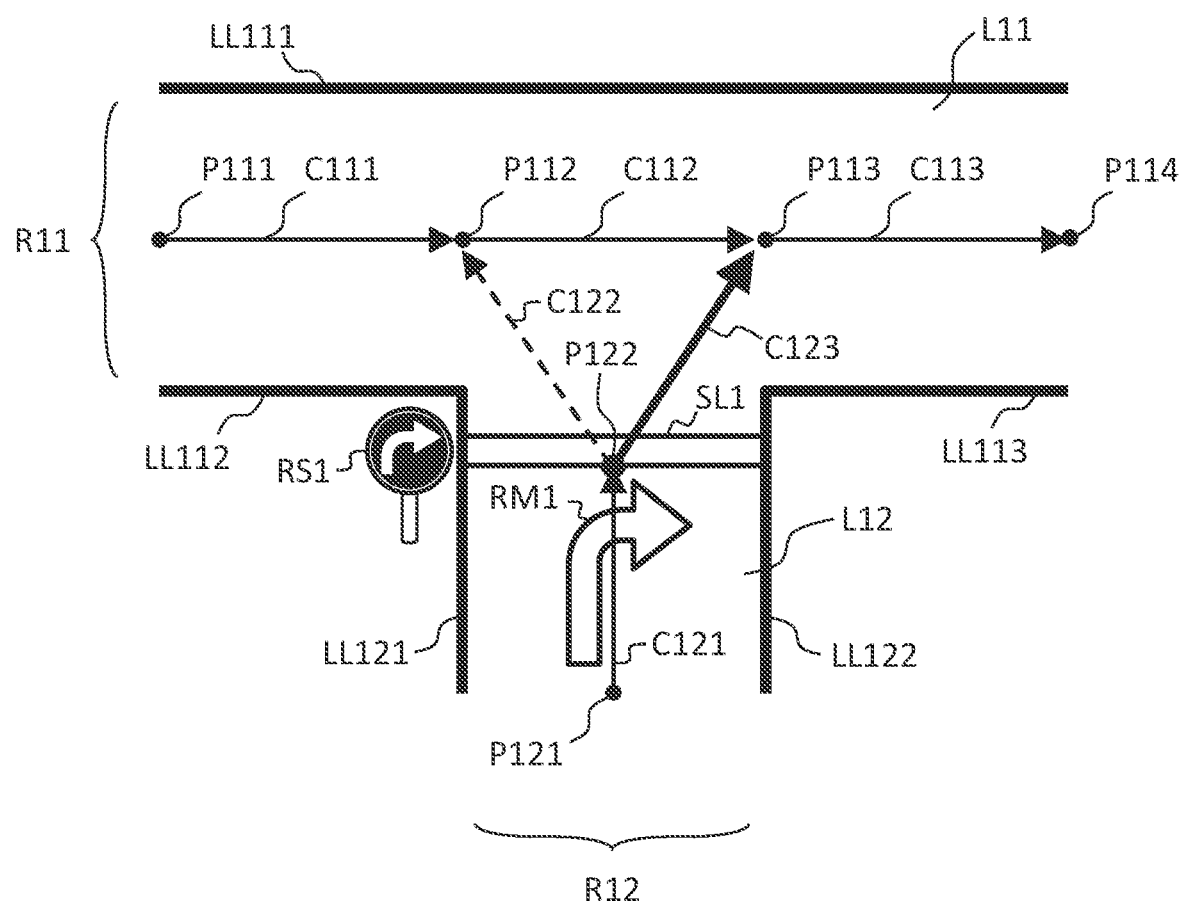
FIG. 3 is a schematic diagram for explaining a first example of update of a map.

FIG. 3 is a schematic diagram for explaining a first example of update of a map. For convenience of explanation, FIG. 3 and FIGS. 4 to 6 described below each illustrate a connection relationship between lanes indicated by a lane network included in a map, on the schematic diagram of roads.

FIG. 3 illustrates roads R11 and R12 crossing at an intersection. The road R11 includes a lane L11 demarcated by lane lines LL111, LL112, and LL113. The road R12 includes a lane L12 demarcated by lane lines LL121 and LL122.

The storage device 12 contains a lane network representing a connection relationship between the lanes L11 and L12. In FIG. 3 and FIGS. 4 to 6 described below, each lane network is represented by connecting lines each extending from a first node set on a lane to a second node reachable from the first node. In FIG. 3 and FIGS. 4 to 6 described below, normal lines, broken lines, and thick lines represent connecting lines corresponding to a lane network prestored in the storage device 12, connecting lines to be deleted by update, and connecting lines newly made by update, respectively.

On the lane L11, nodes P111, P112, P113, and P114 are set. A connecting line C111 extends from the node P111 to the node P112. A connecting line C112 extends from the node P112 to the node P113. A connecting line C113 extends from the node P113 to the node P114.

On the lane L12, nodes P121 and P122 are set. A connecting line C121 extends from the node P121 to the node P122. A connecting line C122 extends from the node P122 to the node P112 set on the lane L11.

From situation data, the detection unit 141 detects a stop line SL1 as well as a signpost RS1 and a road marking RM1 indicating that vehicles should travel rightward at the intersection. The features detected by the detection unit 141 indicate a connection extending rightward from the lane L12 to the lane L11.

In the lane network included in the map stored in the storage device 12, the connecting line C122 representing a connection extending from the lane L12 to the lane L11 is set so as to extend leftward from the node P122 set on the lane L12 to the node P112 set on the lane L11. In other words, the connection relationship represented by the lane network stored in the storage device 12 does not match that indicated by the features detected by the detection unit 141.

The update unit 142 connects the lane L12 where the signpost and the road marking are detected to the lane L11 lying in the travel direction indicated by the signpost or the road marking as viewed from the lane L12, thereby updating the lane network so that it matches the features detected by the detection unit 141. More specifically, the update unit 142 deletes the connecting line C122 extending leftward from the node P122 to the node P112, and makes a new connecting line C123 extending rightward from the node P122 to the node P113.

The update unit 142 may update the lane network so that it matches at least the signpost or the road marking detected by the detection unit 141.

Figure 4:
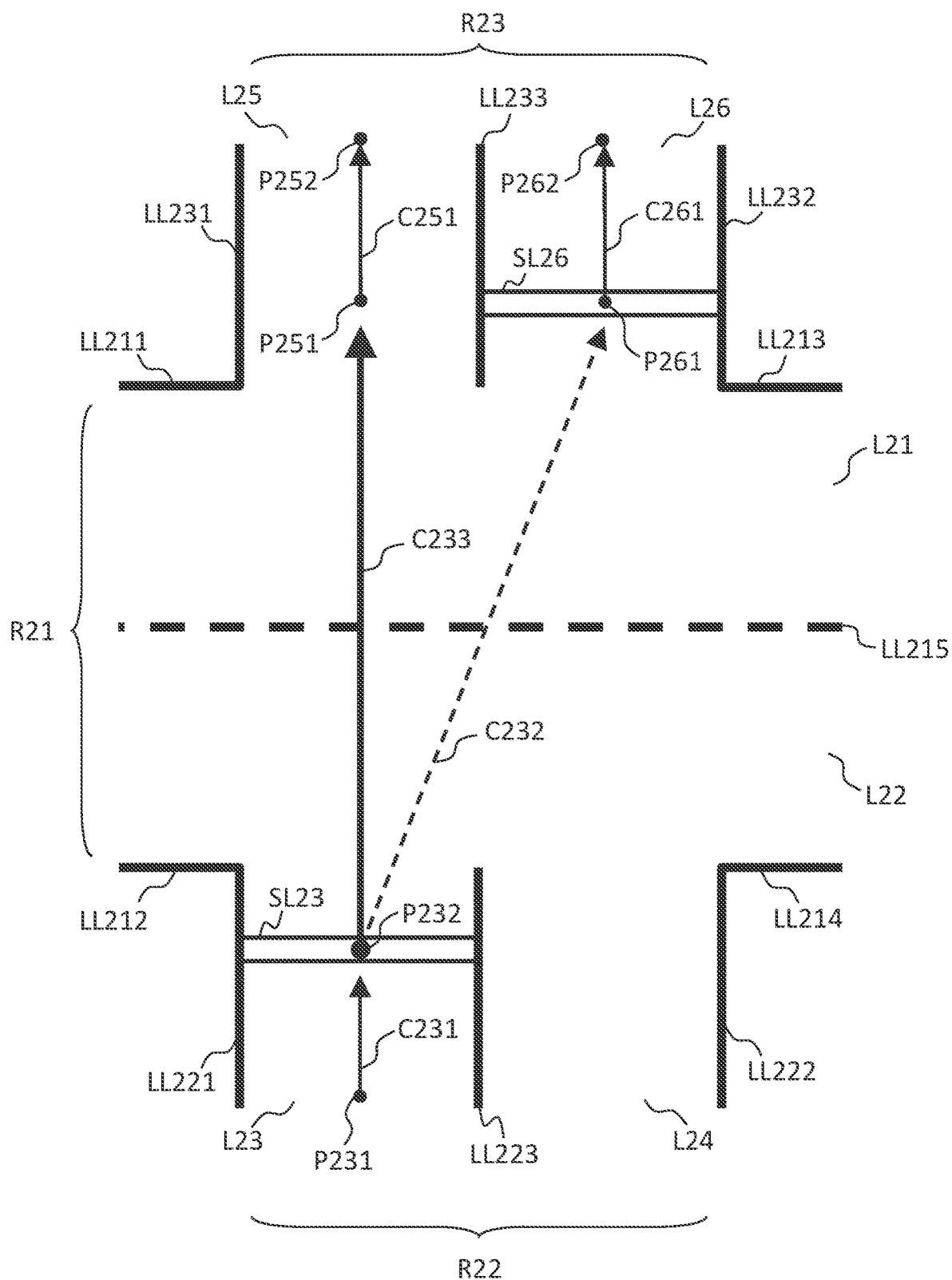
FIG. 4 is a schematic diagram for explaining a second example of update of a map.

FIG. 4 is a schematic diagram for explaining a second example of update of a map.

FIG. 4 illustrates roads R21, R22, and R23 crossing at an intersection. The road R21 includes a lane L21 demarcated by lane lines LL211, LL213, and LL215, and a lane L22 demarcated by lane lines LL215, LL212, and LL214. The road R22 includes a lane L23 demarcated by lane lines LL221 and LL223, and a lane L24 demarcated by lane lines LL223 and LL222. The road R23 includes a lane L25 demarcated by lane lines LL231 and LL233, and a lane L26 demarcated by lane lines LL233 and LL232.

The storage device 12 contains a lane network representing a connection relationship between lanes for the case of proceeding from the lane L23 to the lane L25 or L26 included in the road R23.

On the lane L23, nodes P231 and P232 are set. A connecting line C231 extends from the node P231 to the node P232.

In the road R23, the lane L25 has nodes P251 and P252 whereas the lane L26 has nodes P261 and P262. A connecting line C251 extends from the node P251 to the node P252; a connecting line C261 extends from the node P261 to the node P262.

A connecting line C232 extends from the node P232 set on the lane L23 to the node P261 set on the lane L26.

From situation data, the detection unit 141 detects a stop line SL23 on the road R22 and a stop line SL26 on the road R23 near the intersection of the roads R21, R22, and R23. The stop line SL23 that is detected on the lane L23 and not on the lane L24 suggests that the lanes L23 and L24 are an entry lane and an exit lane of the intersection, respectively. The stop line SL26 that is detected on the lane L26 and not on the lane L25 suggests that the lanes L26 and L25 are an entry lane and an exit lane of the intersection, respectively. Thus the features detected by the detection unit 141 indicate a connection extending from the entry lane L23 to the exit lane L25.

In the lane network included in the map stored in the storage device 12, the connecting line C232 is set so as to extend from the node P232 set on the lane L23 to the node P261 set on the lane L26 near the stop line SL26, as described above. In other words, the lane network included in the map stored in the storage device 12 does not match that indicated by the features detected by the detection unit 141.

The update unit 142 connects the lane L23 where the stop line is detected to the lane L25 where the stop line is not detected, of the lanes connected to the intersection, thereby updating the lane network so that it matches the features detected by the detection unit 141. More specifically, the update unit 142 deletes the connecting line C232 extending from the node P232 to the node P261, and makes a new connecting line C233 extending from the node P232 to the node P251.

The update unit 142 may update the lane network so that it conforms to a traffic rule. For example, the update unit 142 identifies the region of the place represented by situation data, based on its latitude and longitude, and refers to a traffic rule (e.g., a rule that vehicles keep left) stored in the storage device 12 in association with the region. The update unit 142 then deletes the connecting line C232, which does not conform to the traffic rule, and makes the connecting line C233, which conforms thereto.

Figure 5:
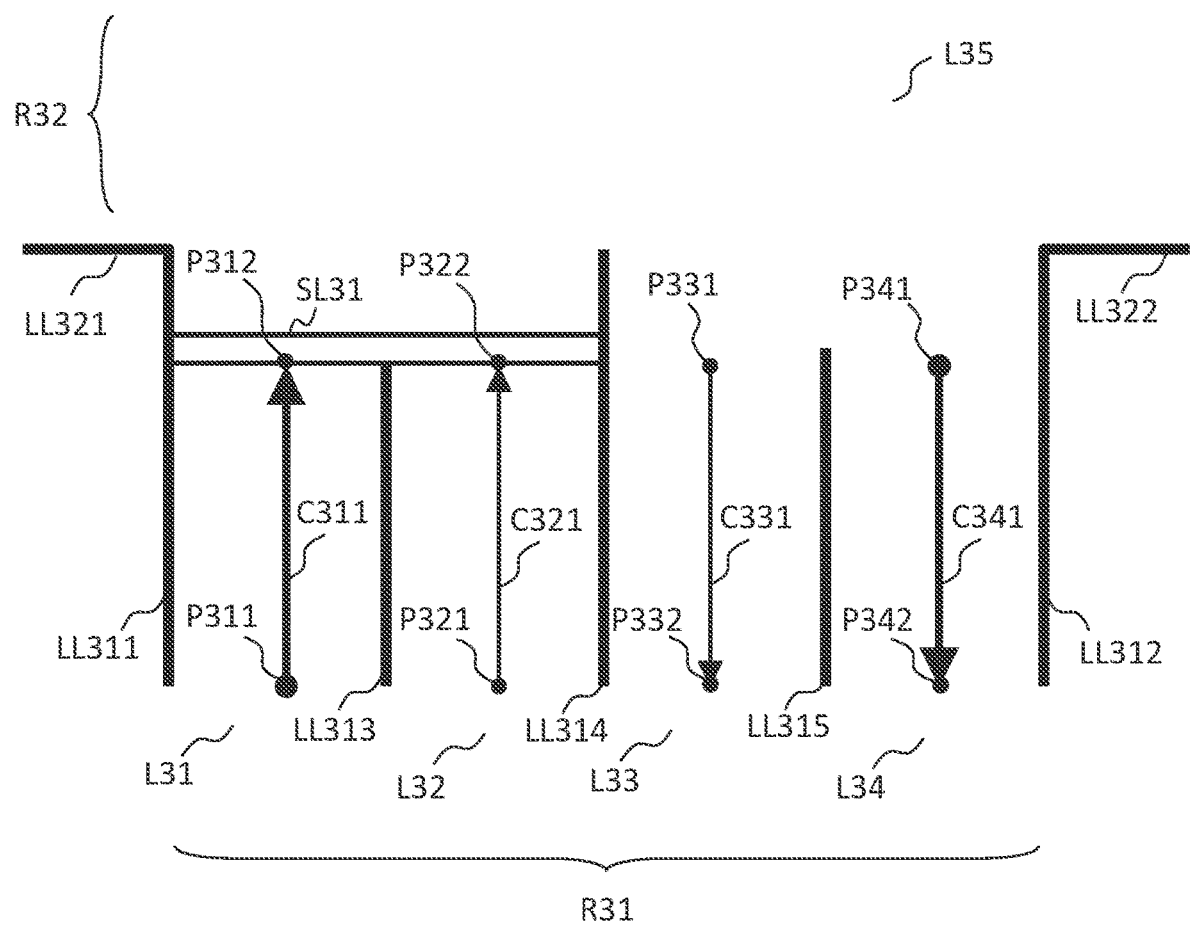
FIG. 5 is a schematic diagram for explaining a third example of update of a map.

FIG. 5 is a schematic diagram for explaining a third example of update of a map.

FIG. 5 illustrates roads R31 and R32 crossing at an intersection. The road R31 includes a lane L31 demarcated by lane lines LL311 and LL313, a lane L32 demarcated by lane lines LL313 and LL314, a lane L33 demarcated by lane lines LL314 and LL315, and a lane L34 demarcated by lane lines LL315 and LL312. The road R32 includes a lane L35 having lane lines LL321 and LL322 as one edge and another lane line (not shown) as the other edge.

The storage device 12 contains a lane network between lanes included in the road R31.

On the lane L32, nodes P321 and P322 are set. A connecting line C321 extends from the node P321 to the node P322.

On the lane L33, nodes P331 and P332 are set. A connecting line C331 extends from the node P331 to the node P332.

On the lanes L31 and L34, no lane network is made, for example, because the lane lines LL311 and LL312 were covered by vehicles parked on the road edges and thus not appropriately detected.

From situation data, the detection unit 141 detects the lane lines LL311, LL312, LL313, LL314, and LL315 and a stop line SL31 on the road R31. The lane lines LL311 to LL315 detected by the detection unit 141 indicates that the road R31 includes four lanes (the number of lane lines—1). The stop line SL31 detected by the detection unit 141 indicates that the lanes L31 and L32 are entry lanes to proceed to the road R32 via the stop line SL31 and that the lanes L33 and L34 are exit lanes to proceed from the road R32 to the road R31.

In the map stored in the storage device 12, the lanes L32 and L33 have a lane network, but the lanes L31 and L34 do not have a lane network, as described above. In other words, the lane network included in the map stored in the storage device 12 does not match that indicated by the features detected by the detection unit 141.

The update unit 142 makes the lane network match lanes the number of which is calculated from the number of detected lane lines, thereby updating the lane network so that it matches the features detected by the detection unit 141. More specifically, the update unit 142 sets nodes P311 and P312 on the lane L31, and makes a connecting line C311 extending from the node P311 to the node P312. The update unit 142 also sets nodes P341 and P342 on the lane L34, and makes a connecting line C341 extending from the node P341 to the node P342.

Figure 6:
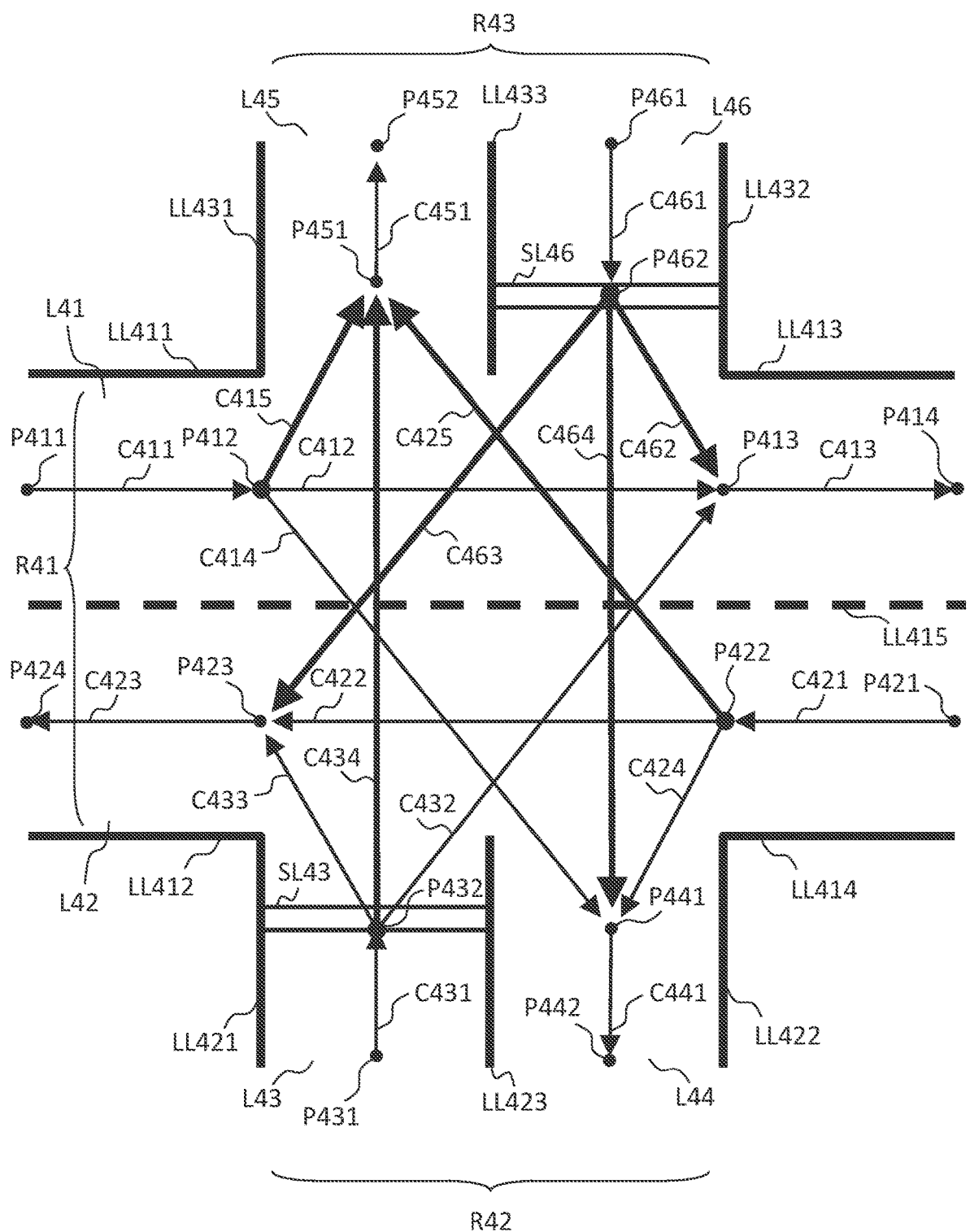
FIG. 6 is a schematic diagram for explaining a fourth example of update of a map.

FIG. 6 is a schematic diagram for explaining a fourth example of update of a map.

FIG. 6 illustrates roads R41, R42, and R43 crossing at an intersection. The road R41 includes a lane L41 demarcated by lane lines LL411, LL413, and LL415, and a lane L42 demarcated by lane lines LL415, LL412, and LL414. The road R42 includes a lane L43 demarcated by lane lines LL421 and LL423, and a lane L44 demarcated by lane lines LL423 and LL422. The road R43 includes a lane L45 demarcated by lane lines LL431 and LL433, and a lane L46 demarcated by lane lines LL433 and LL432.

The storage device 12 contains a lane network representing a connection relationship between lanes for the cases of proceeding from the road R41 to the road R42 and from the road R42 to the road R41. However, the storage device 12 does not contain a lane network representing a connection relationship between lanes for the cases of proceeding from the road R41 or R42 to the road R43 and from the road R43 to the road R41 or R42, for example, because the road R43 is newly opened to traffic.

On the lane L41, nodes P411, P412, P413, and P414 are set. A connecting line C411 extends from the node P411 to the node P412. A connecting line C412 extends from the node P412 to the node P413. A connecting line C413 extends from the node P413 to the node P414.

On the lane L42, nodes P421, P422, P423, and P424 are set. A connecting line C421 extends from the node P421 to the node P422. A connecting line C422 extends from the node P422 to the node P423. A connecting line C423 extends from the node P423 to the node P424.

On the lane L43, nodes P431 and P432 are set. A connecting line C431 extends from the node P431 to the node P432.

On the lane L44, nodes P441 and P442 are set. A connecting line C441 extends from the node P441 to the node P442.

On the lane L45, nodes P451 and P452 are set. A connecting line C451 extends from the node P451 to the node P452.

On the lane L46, nodes P461 and P462 are set. A connecting line C461 extends from the node P461 to the node P462.

In the lane network, the connection relationship between lanes for the case of proceeding from the road R41 to the road R42 is represented by connecting lines C414 and C424. The connecting line C414 extends from the node P412 set on the lane L41 included in the road R41 to the node P441 set on the lane L44 included in the road R42. The connecting line C424 extends from the node P422 set on the lane L42 included in the road R41 to the node P441 set on the lane L44 included in the road R42.

In the lane network, the connection relationship between lanes for the case of proceeding from the road R42 to the road R41 is represented by connecting lines C432 and C433. The connecting line C432 extends from the node P432 set on the lane L43 included in the road R42 to the node P413 set on the lane L41 included in the road R41. The connecting line C433 extends from the node P432 set on the lane L43 included in the road R42 to the node P423 set on the lane L42 included in the road R41.

From situation data, the detection unit 141 detects the lane lines LL431, LL432, and LL433, and a stop line SL46 between the lane lines LL411 and LL413 within a predetermined distance (e.g., 20 m) of the roads R41 and R42. The features detected by the detection unit 141 suggests that the road R43 is connected to the intersection, and that the lanes L46 and L45 are an entry lane and an exit lane, respectively, of the lanes included in the road R43. Thus the features detected by the detection unit 141 indicate that the road R43 is connected to the intersection of the roads R41 and R42, and indicate connections extending from their entry lanes to their exit lanes.

In the lane network included in the map stored in the storage device 12, the lane network including the roads R41 and R42 (first lane network) is not connected to the lane network including the road R43 (second lane network), as described above. Thus, it is not indicated that proceeding from the road R41 or R42 to the road R43 is possible and vice versa. In other words, the lane network included in the map stored in the storage device 12 does not match that indicated by the features detected by the detection unit 141.

The update unit 142 connects the first lane network to the second lane network, thereby updating the lane network so that it matches the features detected by the detection unit 141. More specifically, the update unit 142 makes connecting lines C415, C425, and C434 representing a connection relationship between lanes for the case of proceeding from the road R41 or R42 to the road R43. The update unit 142 also makes connecting lines C462, C463, and C464 representing a connection relationship between lanes for the case of proceeding from the road R43 to the road R41 or R42.

The connecting line C415 extends from the node P412 set on the lane L41 included in the road R41 to the node P451 set on the lane L45 included in the road R43. The connecting line C425 extends from the node P422 set on the lane L42 included in the road R41 to the node P451 set on the lane L45 included in the road R43. The connecting line C434 extends from the node P432 set on the lane L43 included in the road R42 to the node P451 set on the lane L45 included in the road R43.

The connecting line C462 extends from the node P462 set on the lane L46 included in the road R43 to the node P413 set on the lane L41 included in the road R41. The connecting line C463 extends from the node P462 set on the lane L46 included in the road R43 to the node P423 set on the lane L42 included in the road R41. The connecting line C464 extends from the node P462 set on the lane L46 included in the road R43 to the node P441 set on the lane L44 included in the road R42.

In all of the first to fourth examples, update of a map with situation data indicating conditions of roads near an intersection is described; however, update of a map by the apparatus 1 of the present disclosure is not limited to these examples. For example, in the case that a road is extended and that lane lines corresponding to the extended portion are detected from situation data, the apparatus 1 extends a lane network according to the positions of the lane lines detected from the situation data.

Figure 7:
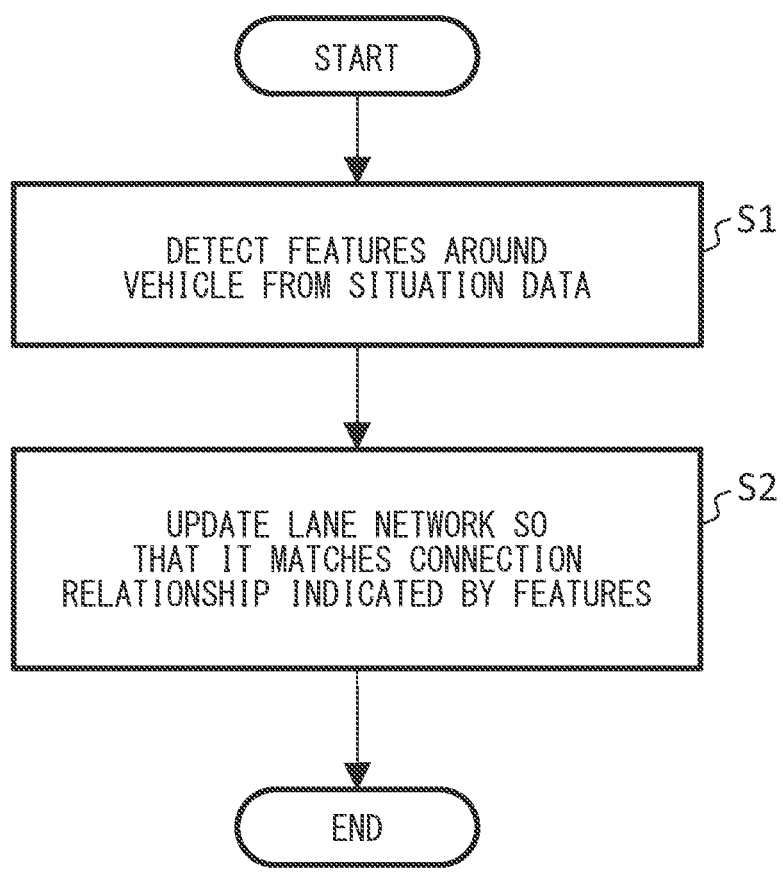
FIG. 7 is a flowchart of a map update process.

FIG. 7 is a flowchart of a map update process. The processor 14 of the apparatus 1 executes the map update process illustrated in FIG. 7 whenever receiving situation data to be processed. The processor 14 of the apparatus 1 may execute the map update process illustrated in FIG. 7 whenever receiving two or more predetermined number of pieces of situation data.

First, the detection unit 141 of the processor 14 detects features around a vehicle traveling on one of lanes passable by the vehicle from situation data representing the situation around the vehicle (step S1).

Next, the update unit 142 of the processor 14 updates a lane network stored in the storage device 12 and representing a connection relationship between lanes so that the lane network matches a connection relationship between lanes indicated by the detected features (step S2); and then it terminates the map update process.

Such a map update process enables the apparatus 1 to update a lane network with data representing features around a vehicle.

Note that those skilled in the art can apply various changes, substitutions, and modifications without departing from the spirit and scope of the present disclosure.

What is claimed is:

1. An apparatus for updating a map for an autonomous-vehicle driving system, comprising a processor configured to:
   receive situation data representing a situation around a vehicle traveling on a road, the situation data including (i) a captured image of a road and a surrounding of the road traveled by the vehicle, (ii) a signal indicating an imaging direction of a camera mounted on the vehicle and acquiring the captured image, and (iii) a focal length of an optical system of the camera;
   detect one or more features from the captured image, the one or more features including a marking on the road and a signpost in a vicinity of the road;
   determine whether the detected one or more features match a lane network representing a connection relationship between lanes included in road sections into which the road is divided, the lane network being stored in a memory and including an intersection between a first lane and a second lane,
      the first lane having at least a first node and a second node and a first connecting line connecting the second node to the first node,
      the second lane having at least a third node and a fourth node, a second connecting line connecting the third node to the fourth node,
      the lane network further including a third connecting line connecting the first node of the first lane to the third node of the second lane;
   in response to determining that the detected one or more features do not match the lane network which includes determining that the marking on the road or the signpost is not consistent with a direction of the third connecting line, update the lane network to match the detected one or more features in the captured image, wherein the updating of the lane network includes deleting the third connecting line and creating a fourth connecting line connecting the first node of the first lane to the fourth node of the second lane; and
   output the updated map to an autonomous vehicle for autonomous driving control based on the updated map.

2. The apparatus according to claim 1, wherein
   in the detection, the processor detects a certain signpost or a certain road marking indicating a travel direction at an intersection from the captured image; and
   in the update, the processor updates the lane network to connect the first lane where the certain signpost or the certain road marking is detected to the second lane lying in the travel direction indicated by the certain signpost or the certain road marking as viewed from the first lane.

3. The apparatus according to claim 1, wherein
   in the detection, the processor detects a stop line near an intersection from the captured image; and
   in the update, the processor updates the lane network to connect a lane where the stop line is detected to a lane where the stop line is not detected, of lanes connected to the intersection.

4. The apparatus according to claim 1, wherein
   in the detection, the processor detects a plurality of lane lines from the captured image; and
   in the update, the processor updates the lane network so that the lane network matches a number of lanes calculated from the detected plurality of lane lines.

5. The apparatus according to claim 1, wherein
   the lane network includes a first lane network and a second lane network that is not connected to the first lane network; in the detection, the processor detects a lane line within a predetermined distance of the first lane network from the captured image, the lane line lying on a road where the second lane network is set; and
   in the update, the processor updates the lane network to connect the first lane network to the second lane network.

6. A method for updating a map for an autonomous-vehicle driving system, comprising:
   receiving situation data representing a situation around a vehicle traveling on a road, the situation data including (i) captured image of a road and a surrounding of the road traveled by the vehicle, (ii) a signal indicating an imaging direction of a camera mounted on the vehicle and acquiring the captured image, and (iii) a focal length of an optical system of the camera;
   detecting one or more features i from the captured image, the one or more features including a marking on the road and a signpost in a vicinity of the road;
   determining whether the detected one or more features match a lane network representing a connection relationship between lanes included in road sections into which the road is divided, the lane network being stored in a memory and including an intersection between a first lane and a second lane,
      the first lane having at least a first node and a second node and a first connecting line connecting the second node to the first node,
      the second lane having at least a third node and a fourth node, a second connecting line connecting the third node to the fourth node,
      the lane network further including a third connecting line connecting the first node of the first lane to the third node of the second lane;
   in response to determining that the detected one or more features do not match the lane network which includes determining that the marking on the road or the signpost is not consistent with a direction of the third connecting line, updating the lane network to match the detected one or more features in the captured image, wherein the updating of the lane network includes deleting the third connecting line and creating a fourth connecting line connecting the first node of the first lane to the fourth node of the second lane; and outputting the updated map to an autonomous vehicle for autonomous driving control based on the updated map.

7. A non-transitory computer-readable medium containing a computer program for updating a map for an autonomous-vehicle driving system, the computer program causing a computer to execute a process comprising:

receiving situation data representing a situation around a vehicle traveling on a road, the situation data including (i) captured image of a road and a surrounding of the road traveled by the vehicle, (ii) a signal indicating an imaging direction of a camera mounted on the vehicle and acquiring the captured image, and (iii) a focal length of an optical system of the camera;

detecting one or more features i from the captured image, the one or more features including a marking on the road and a signpost in a vicinity of the road;

determining whether the detected one or more features match a lane network representing a connection relationship between lanes included in road sections into which the road is divided, the lane network being stored in a memory and including an intersection between a first lane and a second lane, the first lane having at least a first node and a second node and a first connecting line connecting the second node to the first node, the second lane having at least a third node and a fourth node, a second connecting line connecting the third node to the fourth node, the lane network further including a third connecting line connecting the first node of the first lane to the third node of the second lane;

in response to determining that the detected one or more features do not match the lane network which includes determining that the marking on the road or the signpost is not consistent with a direction of the third connecting line, updating the lane network to match the detected one or more features in the captured image, wherein the updating of the lane network includes deleting the third connecting line and creating a fourth connecting line connecting the first node of the first lane to the fourth node of the second lane; and outputting the updated map to an autonomous vehicle for autonomous driving control based on the updated map.

* * * * *